United States Patent Office 3,214,259
Patented Oct. 26, 1965

3,214,259
METHOD OF PRODUCING FREE-FLOWING FERTILIZER
Charles E. Waters, Petersburg, and Fred L. Kelly, Chesterfield County, Va., assignors to Allied Chemical Corporation, New York, N.Y., a corporation of New York
No Drawing. Filed Dec. 6, 1962, Ser. No. 242,587
2 Claims. (Cl. 71—29)

This application is a continuation-in-part of our application Serial No. 594,360, filed June 28, 1956, and now abandoned.

This invention relates to a process for the manufacture of fertilizer materials and to the resulting products. It relates more particularly to a method for the production of a free-flowing granular fertilizer from solid, pulverulent, water-soluble fertilizer materials so as to make them less leachable, less pulverulent and free from dust.

Many commercial fertilizer materials are highly water-soluble, a property which is objectionable for many uses. Thus their use is uneconomical, due to leaching from the soil during heavy rains; injury to the seed may occur from contact of the seed with the fertilizer; and excessive absorption of nutrients by the plants may cause plant damage. In addition, many commercial fertilizers are pulverulent and, as a consequence, are extremely difficult to handle during processing. Furthermore, due to their dusty nature the final product is one which is neither as pleasing in appearance nor as easy to use as it would be if it were granular in form. Examples of such materials are: nitraphosphates, the so-called mixed fertilizers, the superphosphates and urea itself.

We have discovered that, in accordance with the present invention, such water-soluble fertilizer materials can be converted to free-flowing granular form in which the fertilizer is coated with a thin coating of a urea-formaldehyde resin that forms a crust on the granules which resists the leaching action of water, but yet does not interfere with the fertilizing action and itself imparts fertilizing activity to the final product.

The invention also provides novel fertilizer materials having such advantageous properties.

According to the present invention free-flowing granular fertilizers in the form of solid water-soluble fertilizer materials having leach-resistant coatings are produced by coating a solid, pulverulent, water-soluble fertilizer material under acid conditions, more particularly, about pH 2 to about pH 5 and preferably pH 3 to pH 4, with a coating solution which is a concentrated aqueous urea-formaldehyde solution containing 5% to 15% of water, and preferably 7% to 12% of water, based on the weight of the solution, and amounts of urea, formaldehyde and polymethylol ureas in solution corresponding to less than 1 mol of urea, more particularly at least 0.2 mol but less than 1 mol of urea and preferably 0.4 to 0.9 mol of urea, per mol of formaldehyde, the proportion of coating solution being about $\frac{1}{20}$ to about $\frac{1}{10}$ of the weight of the water-soluble fertilizer; subjecting said mixture to sufficient mechanical agitation to coat the pulverulent fertilizer with the resulting viscous urea-formaldehyde resin, and continuing the mechanical agitation until hard non-caking granules are obtained in which the said urea-formaldehyde resin forms a thin crust which resists leaching of the water-soluble fertilizer material.

We have discovered, that the urea-formaldehyde resin coated products thus produced overcome the above mentioned objectionable properties of the water-soluble fertilizer materials, without interfering with the fertilizer activity of the products. Thus, we have discovered, when water-soluble solid pulverulent fertilizers are subjected to the treatment set out above in accordance with the present invention, that the resulting granular products are free-flowing, relatively dust-free fertilizer materials which are much more resistant to leaching by water than the untreated materials and which have a high activity index when tested by the test procedures of the Association of Official Agricultural Chemists. Granular products produced in accordance with the present invention show an activity index considerably above 40 for the water-insoluble nitrogen thereof, when tested by the procedure given in paragraph 2.058 of the Official Methods of Analysis of the Association of Official Agricultural Chemists, 9th edition, 1960. (Where in the claims, an "activity index value above 40" for the water-insoluble nitrogen of the granular fertilizer is referred to, it will be understood that this procedure for measuring the index value is intended.)

This result is surprising, because the urea-formaldehyde resins which are formed under acid conditions from aqueous urea-formaldehyde mixtures containing the urea and formaldehyde in the low molar ratios set out above are themselves unsatisfactory fertilizer materials. Heretofore it was considered undesirable to employ urea and formaldehyde in the low molar ratios set out above, owing to the fact that they lead to the formation of resins rather than so-called "urea-form" compositions. Since the resins are much less soluble in water than the "urea-form" compositions, it was heretofore considered necessary to avoid resin formation, since otherwise the fertilizer materials would not have adequate fertilizer activity because of the unavailability of the insoluble nitrogen locked up in the resin. Therefore, it was heretofore considered necessary, for fertilizer use, to employ urea and formaldehyde in mol ratios considerably greater than 1 (Industrial and Engineering Chemistry, vol 40, 1948, page 1178).

While we do not wish to be limited to any theoretical considerations, we believe this result is due to the fact that, notwithstanding the effectiveness of the crusts of urea-formaldehyde resin in limiting the leachability of the granules by water, they are nevertheless not of sufficient thickness, when produced in accordance with the process of the present invention, to interfere with the fertilizer activity of the granule as a whole and are themselves gradually broken down to supply nitrogen fertilizer.

When pulverulent water-soluble fertilizer materials are treated with a concentrated aqueous solution of urea, formaldehyde and polymethylol ureas under acid conditions, in accordance with the present invention, the solids are uniformly smeared with the liquid or semi-liquid viscous urea-formaldehyde resin-forming mass and brought together into conglomerates in which fine particles are bound into hard granules in which urea-formaldehyde resin is the stable matrix and coating medium which reduces or prevents further caking action by the individual granules. The treated materials can readily be sized by screening, grinding or crushing as desired.

The coatings of urea-formaldehyde resin reduce loss of plant nutrients due to leaching from the soil during heavy rains, minimize salt injury due to contact of the fertilizer with seeds, and level out excess absorption of fertilizer nutrients.

The process for the surface coating of the fertilizer materials is extremely simple and can be carried out in equipment of the type which usually may be found in a plant where materials are mechanically mixed with one another. A rotary drum mixer provided with a spray device has been found especially well adapted for this purpose. When a device of this type is used, the water-soluble fertilizer material is fed into the rotating drum into which the ureaformaldehyde aqueous coating solution is then added.

In carrying out the process according to our invention, any suitable urea-formaldehyde solutions having the required concentrations of components may be used. It is advantageous, however, from a practical standpoint to utilize urea-formaldehyde solutions in which the formaldehyde component and part of the urea are supplied in the form of stabilized solutions of urea-formaldehyde reaction products prepared according to the teachings of U.S.P. 2,652,377, issued September 15, 1953, particularly Example 1 thereof, and commercially available as "U.F. Concentrate-85" and "N-dure." "U.F. Concentrate-85" is a clear, colorless, viscous, stabilized solution of formaldehyde and urea reaction products in a small amount of water. It contains about 15% water and approximately 85% solids, the latter combined in a formaldehyde to urea mol ratio of about 4.6 to 1 (a U/F ratio of 1/4.6). It is believed to be a mixture of polymethylol ureas in solution. The mixture is non-resinous and all the formaldehyde is available for resin-forming reactions. Such materials are particularly suitable for use because of their low water content and high concentration of formaldehyde and polymethylol ureas.

To form the concentrated coating solution, additional urea is preferably added to the U.F. concentrate in the amount required to provide, in solution, a mixture of urea, formaldehyde and polymethylol ureas in amounts corresponding to a mol ratio of urea: formaldehyde (hereinafter referred to as the "U/F ratio") of less than 1, more particularly more than 0.2 but less than 1, and preferably 0.4–0.9. Each methylol group in the methylol ureas is considered equivalent to one molecule of formaldehyde.

The coating solutions can be prepared in other ways, for example, by dissolving urea and formaldehyde in water in the required amounts.

Limitation of the amount of water present in the coating solution to the limits set out above constitutes an important feature of the invention, inasmuch as solutions which are too dilute tend to dissolve some of the soluble fertilizer materials during the mixing operation and prevent the formation of a water-resistant resin coating.

While in the preferred practice of the invention the concentrated aqueous coating solution is prepared by dissolving urea in the coating solution prior to its application to the water-soluble fertilizer material to be treated, it is possible to obtain the benefits of the invention by employing a fertilizer material which includes urea as a component thereof and treating it with a concentrated aqueous solution of formaldehyde and polymethylol ureas; depending upon the fertilizer material to supply the required urea by dissolution thereof in the coating solution. But in such cases, the amount of water in the aqueous solution must fall within the limits set out above, and the amounts of formaldehyde and polymethylol ureas in said solution must be such as to limit the U/F ratio of the resulting solution (based on the solubility of urea under the existing conditions and of the other substances in the solution, including other fertilizer components which may dissolve therein) to the range set out above. By having the urea present in the coating solution as applied, it is possible to obtain better control of the pH of the coating solution and of the coating conditions.

The acid conditions required for carrying out the process of the present invention can be obtained in various ways. Thus, acids or salts which give acid conditions in aqueous solution can be added to the coating solution in amounts to provide an acidity falling within the above pH range, a number of which are commonly employed in fertilizer manufacture. Examples of such acids and salts are phosphoric acid, sulfuric acid, ammonium sulfate, ammonium nitrate, ammonium phosphate and the acidic complex phosphate and nitrate fertilizer materials.

If desired, the acid conditions can be supplied by the use of acidic fertilizer materials, such as superphosphate. For example, when superphosphate was treated in accordance with this invention, it was not only improved in physical appearance and free-flowing characteristics but it also was improved from the standpoint of its fertilizing characteristics in that in its treated condition it contained a certain amount of water-insoluble but available nitrogen.

When the acid is added to the coating solution, the added urea is preferably incorporated into the solution shortly before use; otherwise the resin-formation takes place before the coating can be effected. Preferably the coating solution is not acidified until it is to be used; or the acidity is supplied by the fertilizer to be coated.

While mixed fertilizers such as those appearing under the designation 12–12–12 are granular in appearance, it has been found that if they are treated in accordance with this invention they will be given a coating or crust of insoluble but available nitrogen and enhanced fertilization characteristics. Since the coating on some of the particles will take longer to break down than it will on certain other of the particles, the readily soluble constituents of the first group will not leach out as readily as they will from the latter group and soluble constituents thus become progressively available. This tends to prolong the effective life of the entire fertilizer. In particular, it has been found that the rate of extraction of $P_2O_5$ from the fertilizer is greatly decreased by this treatment. This maintains the $P_2O_5$ in a form in which it is available to plant life, and prevents loss of its activity by fixation in the soil particles.

Thus, the present invention provides a means for providing water-soluble fertilizers with a crust of leach resistant long feeding nitrogen in a very simple and economical manner. The products are free-flowing and will release their nitrogen slowly over the entire growing season.

If desired, additional nitrogen can be added to the material in the form of ammonia after surface conditioning the otherwise pulverulent fertilizer, without deleteriously affecting the free-flowing and granular characteristics and leach resistance imparted by the treatment. Furthermore, the treatment lends itself to the making of chemically blended high quality granular type fertilizers having a wide variety of ratios of quickly soluble and slowly soluble nitrogen. It can thus be seen that the process can advantageously be used in the production of dust-free, free-flowing, granular, mixed fertilizers of all types including those which may contain 30% or more of nitrogen. Fertilizers of this type which are presently on the market, preferably contain 3–16% nitrogen and from 5–20% $P_2O_5$, preferably 6–16%, and potash salts in the amount of 0–20%. The $K_2O$ content preferably ranges from 4–10%. Fertilizers prepared in accordance with this invention have been found to be homogeneous in the stated ranges and exhibit a good activity of the water insoluble nitrogen and have not been found to have been harmed with respect to their $P_2O_5$ availability.

In the making of such mixed fertilizers, the various ingredients may naturally be obtained from the normal sources used in the manufacture of fertilizers of this type. In general practice, the various ingredients are mixed in a rotary drum to which the concentrated coating solution of urea, formaldehyde and polymethylol ureas is then added. In those cases in which it is desired to further augment the nitrogen content of fertilizer, the product can be further ammoniated before being withdrawn from the rotary drum. This ammoniation is preferably done a few minutes after the urea and formaldehyde have had an opportunity to mix with the fertilizer ingredients under acid conditions and form the urea-formaldehyde resin coating. Thereupon, ammonia or ammonia and ammonium nitrate may be added to bring the entire mixture to an almost neutral but still acid state.

The invention will be illustrated by the following specific examples in which parts and percentages are by weight and temperatures are in degrees centigrade.

EXAMPLE 1

A rotary drum was charged with 1800 parts of ammonium sulfate, and while the drum was rotated at a speed of 15 r.p.m., the charge was sprayed with 200 parts of a concentrated aqueous coating solution containing about 180 parts of a mixture of urea, formaldehyde and methylol ureas in about 20 parts of water and having a U/F ratio of 0.64. (This solution was prepared by dissolving 68.4 parts of urea in 131.6 parts of a commercial urea-formaldehyde solution ("U.F. Concentrate-85," referred to above) containing free formaldehyde, methylol ureas and water in amounts equivalent to 25% urea, 60% formaldehyde and 15% water.) The mixture was transferred to a rotary drier and dried for 15 minutes to a product temperature of 75°. The dried product contained 21.6% total nitrogen, 19.4% ammoniacal nitrogen, 0.1% free urea nitrogen, 1.8% water-insoluble nitrogen and 0.1% water.

To determine leach resistance, a 1.0-gram sample of the product was leached with successive 20-ml. portions of water. The results, tabulated below, show the slow, sustained release of ammonia, as compared with a 1.0-gram sample of the uncoated ammonium sulfate.

*Table 1*

| Leaching Number | Percentage ammonia leached | |
|---|---|---|
| | Coated | Uncoated |
| 1 | 11 | 71 |
| 2 | 34 | 23 |
| 3 | 22 | 3 |
| 4 | 11 | 0.2 |
| 5 | 7 | 0.2 |

EXAMPLE 2

Fifty-four pounds of a commercial 12–12–12 fertilizer (prepared in accordance with U.S. Patent 2,680,680 and containing 12% N–12% $P_2O_5$–12% $K_2O$) was charged to a concrete mixer, and while being agitated was sprayed with six pounds of a concentrated aqueous coating solution of the type employed in Example 1 and having a U/F ratio of 0.64. The solution was prepared by dissolving 2.05 pounds of urea in 3.95 pounds of the commercial urea-formaldehyde solution (equivalent to 25% urea, 60% formaldehyde and 15% water). The mixture was spread out to dry in the air for one hour, and then it was dried in an oven at 75° for two hours. The dried product had the following composition, as compared to the uncoated starting material:

*Table 2*

| | N | $P_2O_5$ | $K_2O$ | $H_2O$ |
|---|---|---|---|---|
| | Percent | Percent | Percent | Percent |
| Coated product | 13.2 | 11.4 | 11.0 | 2.6 |
| Uncoated | 12.0 | 12.5 | 11.8 | 1.5 |

To determine leach resistance, a 1.0-gram sample of the product was leached with successive 20-ml. portions of water. The results, tabulated below, show the slow, sustained release of nitrogen, phosphorus and potassium, as compared with a 1.0-gram sample of the uncoated fertilizer.

*Table 3*

| Leaching Number | Percentage leached | | | | | |
|---|---|---|---|---|---|---|
| | Coated | | | Uncoated | | |
| | N | P | K | N | P | K |
| 1 | 32 | 2 | 34 | 63 | 3 | 76 |
| 2 | 31 | 2 | 31 | 31 | 2 | 17 |
| 3 | 8 | 1 | 12 | 3 | 1 | 1 |

EXAMPLE 3

*Part A.*—A coating solution of the type employed in Example 1, and having a U/F ratio of 0.64, was sprayed on granular commercial superphosphate fertilizer (containing about 20% $P_2O_5$) in a rotary mixer. Materials used were 34 parts of superphosphate fertilizer 2.5 parts of "U.F. Concentrate-85" solution, and 1.3 parts of urea. Mixing was carried out at room temperature (about 25°). After mixing for several minutes, the material was dumped from the mixer and dried in an oven at 65° for 15 minutes. Analysis of the coated material by AOAC test (paragraph 2.058 of the Official Methods of Analysis, 9th edition, 1960), showed an activity index of 67.3 for the water-insoluble nitrogen.

The resistance of the coated superphosphate product to leaching with water was compared with that of the uncoated superphosphate starting material by subjecting a 100 gram sample of each material to leaching with 100 grams of water. Only 4.4% of the $P_2O_5$ was leached from the coated superphosphate product, whereas about 30% of the $P_2O_5$ was leached from the uncoated superphosphate.

*Part B.*—The process of Part A of this example was repeated but with a coating solution containing a larger proportion of urea; the U/F ratio was 1.45. When the resulting product was subjected to the same leaching test with water, 16.3% of the $P_2O_5$ was leached from the product sample.

EXAMPLE 4

Commercial crystalline urea (39 parts) was screened through a 20 mesh sieve to remove lumps and then heated to 50–70°. The resulting product was then sprayed with one part of commercial urea-formaldehyde solution of the type referred to above ("U.F. Concentrate-85") to which had been added 0.02 part of 96% aqueous sulfuric acid. The spraying time was about 10 minutes. The sprayed product was dried for about 15 minutes at a product temperature of about 80–95°. The resulting product had a bulk density of 0.70 gram per cc. as compared to 0.8 gram per cc. for the crystalline urea. After storing this product for 30 days, the physical condition of the product was found to be distinctly better and more free flowing than that regularly observed in untreated crystalline urea after storage.

EXAMPLE 5

Urea (314 parts) was mixed with 1728 parts of commerically produced superphosphate fertilizer (analyzing 19.29% available $P_2O_5$) in a rotary drum. Into this was sprayed 174 parts of commercial urea-formaldehyde solution of the type referred to above ("U.F. Concentrate-85"). The product analyzed 8.31% total nitrogen and 15.35% available $P_2O_5$ and showed a pH of 2.95 when mixed with water.

EXAMPLE 6

A solid fertilizer was made by first mixing, in a rotary drum rotating at 15 r.p.m., for about 5 to 15 minutes, 581 parts of superphosphate (19.78% $P_2O_5$), 152 parts of urea (46.3% N), 121 parts of $(NH_4)_2SO_4$ (20.5% N), 136.6 parts of KCl (60.0% $K_2O$), 374 parts of dolomite and 405 parts of sand. Then 93 parts of commercial urea-formaldehyde solution of the type employed in Example 5 were sprayed onto the solids through a perforated tube in about 30 seconds; followed in a few minutes by 137.5 parts of an ammoniating solution containing 22% $NH_3$, 65% $NH_4NO_3$ and 13% $H_2O$. The product was mixed further for a few minutes to be sure all the ammonia had been absorbed and then it was dumped. A sample was taken for analysis and the remainder was stored at 50°. The product analyzed 8.11% N, 5.97% $P_2O_5$, 0.11% citrate-insoluble $P_2O_5$, 5.73% moisture by oven drying. It had a pH of 6.00. The water-insoluble nitrogen was 2.26% by the AOAC test and had an activity of 87.2% by the AOAC neutral permanganate test. The product was dust-free, free-flowing and did not cake in storage. The product contained 2.93% free urea.

EXAMPLE 7

A solid fertilizer was made by first mixing, in a rotary drum rotating at 22 r.p.m., for about 5 to 15 minutes, 1570 parts of superphosphate (19.78% $P_2O_5$), 244.5 parts of urea (46.3% N), 102.7 parts of KCl (60.0% $K_2O$), 126.8 parts of $K_2SO_4$, 205.0 parts of dolomite, and 506.5 parts of sand. Then 190 parts of commercial urea-formaldehyde solution of the type employed in Example 5 were sprayed through a perforated tube onto the solids in about 30 seconds; followed after 5 minutes by 54.5 parts of anhydrous ammonia. After a few minutes of further mixing to assure complete $NH_3$ absorption, the product was dumped. A sample was taken for analysis and the rest was stored at 50°. The product analyzed 6.06% N, 10.26% $P_2O_5$, 0.32% citrate-insoluble $P_2O_5$, 7.32% moisture by oven drying. It had a pH of 6.10. The water-insoluble nitrogen was 2.47% by the AOAC test and had an activity of 95.1% by the AOAC neutral permanganate test. The product was dust-free, free-flowing and granular.

While the above description discloses preferred and practical embodiments of the process for surface coating solid, pulverulent water-soluble fertilizer materials in accordance with this invention, to render them leach resistant, it will be understood that the specific details set forth herein are by way of illustration and are not to be construed as limiting the scope of the invention.

We claim:
1. The method of producing free-flowing granular fertilizer in the form of a solid, water-soluble fertilizer material having a leach-resistant coating; which comprises
coating, under acid conditions of pH 3 to pH 4, a solid, pulverulent, water-soluble fertilizer commercially produced acidic nitraphosphate fertilizer which is heated to about 80° C. by spraying onto the nitraphosphate fertilizer while at a temperature of about 65° C. a freshly prepared coating solution containing 7% to 12% of water and amounts of urea, formaldehyde and polymethylol ureas corresponding to 0.4 to 0.9 mol of urea per mol of formaldehyde, said coating solution obtained by dissolving urea in a urea-formaldehyde concentrate of higher formaldehyde content, the proportion of said coating solution added being about 1 part by weight coating solution to about 20 parts by weight of nitraphosphate fertilizer;
subjecting said mixture to sufficient mechanical agitation to uniformly coat the pulverulent nitraphosphate fertilizer with the resulting viscous urea-formaldehyde resin; and
continuing the mechanical agitation until hard non-caking granules are obtained in which the said urea-formaldehyde resin forms a thin crust which resists leaching of the water-soluble nitraphosphate fertilizer.

2. A method of producing a free-flowing granular fertilizer in the form of a solid, water-soluble fertilizer material having a leach-resistant coating which comprises
coating a solid, pulverulent, water-soluble fertilizer material comprising essentially a commercially produced acidic nitraphosphate fertilizer, under acid conditions of pH 3 to pH 4 by spraying it with a solution which is a concentrated aqueous, formaldehyde solution containing 5% to 15% of water, based on the weight of the solution, and amounts of urea, formaldehyde and polymethylol urea in water corresponding to 0.4 to 0.9 mol of urea per mol of formaldehyde, the proportion of coating solution being about $\frac{1}{20}$ to about $\frac{1}{10}$ of the weight of the water-soluble fertilizer material;
subjecting said mixture to a sufficient mechanical agitation to uniformly coat the pulverulent fertilizer with the resulting viscous urea-formaldehyde resins;
thereafter adding to the mixture an ammoniating solution containing 22% $NH_3$, 65% $NH_4NO_3$ and 13% $H_2O$, in an amount sufficient to change the pH of the resulting mixture to 6; and
continuing the mechanical agitation until hard, non-caking granules having an activity index value above 40 for the water insoluble nitrogen thereof are obtained in which the said urea-formaldehyde resin forms a thin crust which resists leaching of the water-soluble fertilizer material.

References Cited by the Examiner
UNITED STATES PATENTS

| 2,255,026 | 9/41 | Keenen et al. | 71—30 |
| 2,415,705 | 2/47 | Rohner et al. | 71—28 |
| 2,502,996 | 4/50 | Rohner | 71—30 |
| 2,618,546 | 11/52 | Davenport | 71—28 |
| 2,766,283 | 10/56 | Darden | 71—28 |

DONALL H. SYLVESTER, *Primary Examiner.*
ANTHONY SCIAMANNA, *Examiner.*